March 22, 1966  J. G. RAYNIAK ET AL  3,241,228
CUTTER BAR CONSTRUCTION AND METHOD OF MANUFACTURE
Filed March 8, 1962
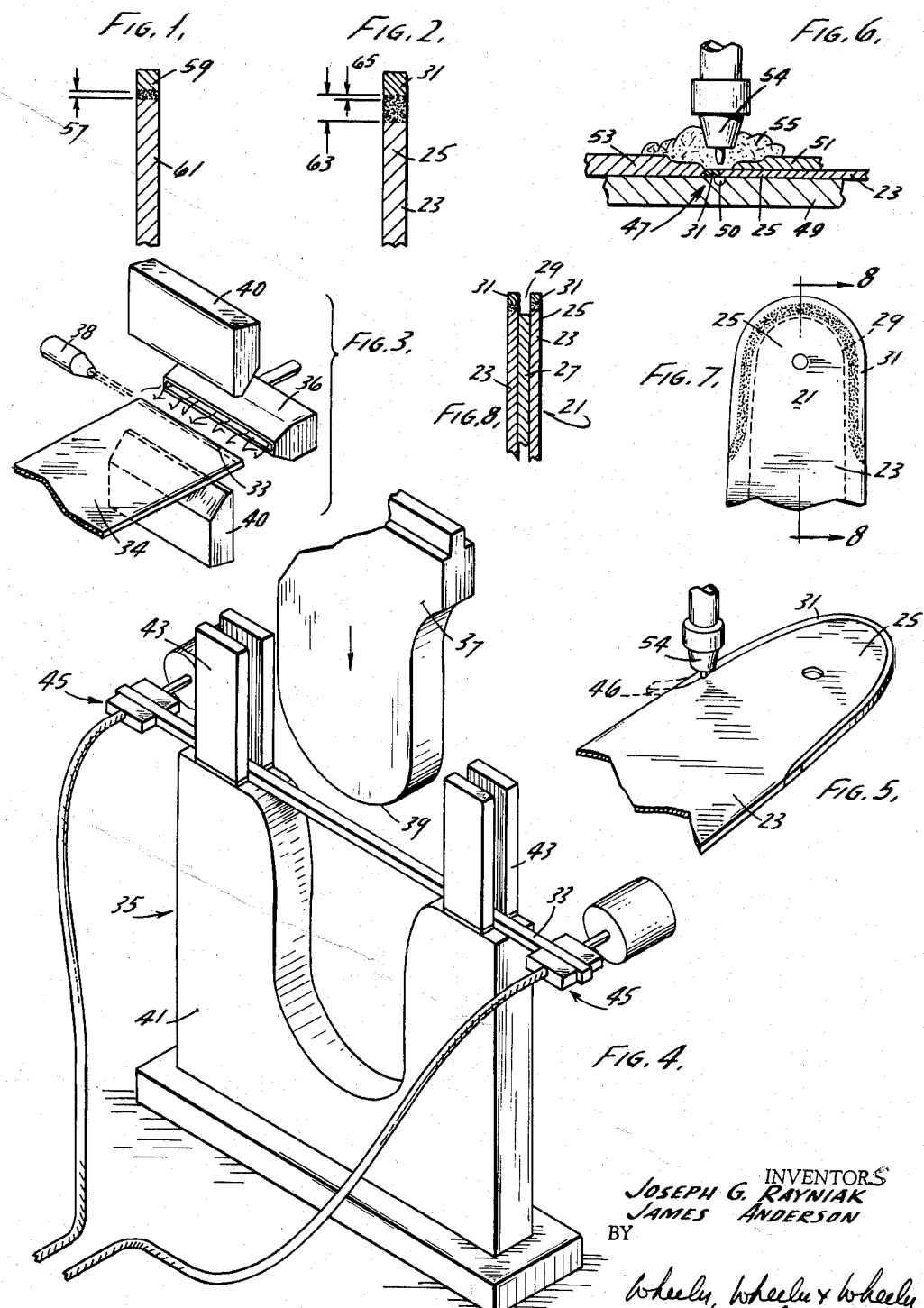
INVENTORS
JOSEPH G. RAYNIAK
JAMES ANDERSON
BY
Wheeler, Wheeler & Wheeler
ATTORNEYS.

United States Patent Office 3,241,228
Patented Mar. 22, 1966

3,241,228
CUTTER BAR CONSTRUCTION AND METHOD OF MANUFACTURE
Joseph G. Rayniak, Waukegan, Ill., and James Anderson, Peterborough, Ontario, Canada, assignors to Outboard Marine Corporation, Waukegan, Ill., a corporation of Delaware
Filed Mar. 8, 1962, Ser. No. 178,442
5 Claims. (Cl. 29—475)

The invention generally relates to the uniting of a non-ferrous material to a ferrous material to obtain increased wear resistance characteristics. More particularly, the invention relates to the fabrication of cutter bars for chain saws, which cutter bars include peripherally slotted, wear resistant edge portions adapted for guiding the travel of the saw chain around the cutter bar.

Saw chain cutter bars have marginal portions upon which a saw chain is guided. The track is provided by face plate members of alloy steel in laminated assembly with an intervening spacer plate, which is of lesser area, to provide the bar with a channel about its perimeter. In this channel the teeth of the chain links are received and guided.

Since the arcuate ends of the face plate upon which the links ride are subject to heavy wear, it has been common to protect these end margins with a bead or tip of wear resistant, non-ferrous metallic alloy material deposited on the arcuate margin in molten form from a welding rod. One such material which has proven very satisfactory and has been commonly employed is marketed by the Haynes Stellite Co., under the trademark "Stellite," and is a hard, corrosion-resistant, non-ferrous alloy containing cobalt, chromium, carbon, and, possibly, tungsten and silicon. After solidifying of the molten "Stellite" deposited along the periphery of the plate members, the "Stellite" was ground to provide a smooth outer surface and to provide the before-mentioned peripheral guide slot. An analysis of the cast or deposited "Stellite" reveals a typical dendritic structure, with the primary phase being a cobalt-rich solid solution. The binary eutectic phase is primarily $Cr_7C_3$ carbides in a matrix of cobalt-rich solid solution.

Fabrication of the cutter bar in the above described manner has various disadvantages. For example, the molten deposit along the edge of the plate members of a bead or tip of "Stellite" results in a relatively weak joint between the "Stellite" and the plate members. Moreover, the heat of welding impairs the previous heat treatment of the plate members, rendering the affected areas relatively soft. In addition, as the "Stellite" is melted prior to application thereof to the edge of the cutter bar, a rather coarse grain, cast structure results in the "Stellite." Moreover, the above described arrangement for fabricating a cutter bar is very expensive. Because of the hardness of the "Stellite," the grinding of a smooth outer periphery and the peripheral slot is particularly expensive. In addition, a large amount of "Stellite" is ground away, thereby also adding to the expense involved.

Accordingly, the present invention contemplates prefabricating bar elements (which may comprise the flanges of a one-piece channeled bar, but will usually comprise the margins of the face plates of a laminated bar); the separate prefabrication of strips of non-ferrous type material of desired dimensions and contour for application to the arcuate terminal margins of the bar elements, which non-ferrous material is preferably wrought, i.e., cast and then rolled in plate form, and is subsequently cut into strip form and formed to the desired contour; the fusion of the strips to the bar elements without such heat distortion as to require extensive finishing; and, finally, the step of relieving stress by a heat treatment which may, in the case of a brazed laminated bar, be achieved by the operation of brazing the laminae of the bar to each other.

As will become apparent, the disclosed method employs, in contrast to a molten deposit of "Stellite," a preformed strip of wrought "Stellite" material which has previously been cast and rolled to improve its physical properties. Specifically, the cast and rolled "Stellite" has higher tensile and yield strength and greater ductility than does cast "Stellite" which is not rolled. As will also become apparent, the wrought "Stellite" material is cut, formed, and bonded, as by welding, to the plate members in such manner as not to materially change the grain structure and the resulting properties of the "Stellite" except along and immediately adjacent to the weld metal joint. The unaffected major part of the "Stellite" retains its original grain structure which is typical of wrought material with relatively large round-shaped carbides of the $M_7C_3$ type dispersed throughout the grains. In general this grain structure is finer than the structure of the cast "Stellite."

The resulting cutter bar, having "Stellite" tips united thereto in accordance with the invention, displays marked resistance to burring of the tip members by the saw chain, a substantial increase in torque strength, i.e., resistance to cracking under a torque producing load, and vastly improved resistance to thermal fatigue.

The objects of the invention include the provision of an improved method for applying a wear resistant, non-ferrous surface on a ferrous member, the provision of an improved method of fabricating a cutter bar for a chain saw, and the provision of a cutter bar with a "Stellite" tip having improved physical properties as compared to the properties of previous "Stellite" tipped cutter bars.

Other objects and advantages of the invention will become known by reference to the following description and the accompanying drawings of one embodiment of the invention.

In the drawings:

FIGURE 1 is a fragmentary sectional view of the weld resulting from previous methods of applying a non-ferrous wear resistant tip to a ferrous plate member;

FIGURE 2 is a fragmentary sectional view of a weld in accordance with the invention; which view permits comparison with FIGURE 1 of the zone of fusion between the non-ferrous, wear resistant tip and the ferrous plate member;

FIGURE 3 is a fragmentary, diagrammatic perspective view illustrating an arrangement for shearing an edge strip from a plate of non-ferrous, wear resistant material;

FIGURE 4 is a fragmentary, diagrammatic perspective view illustrating an arrangement for forming the non-ferrous wear resistant material into a predetermined shape;

FIGURE 5 is a perspective view illustrating the application of the non-ferrous material to a ferrous plate;

FIGURE 6 is a sectional view illustrating the arrangement for welding the non-ferrous material to a plate;

FIGURE 7 is a fragmentary plan view of a cutter bar in accordance with the invention; and FIGURE 8 is a sectional view taken along line 8—8 of FIGURE 7.

While the cutter bar may be made in one piece by cutting a channel between marginal flanges, the bar 21 selected to exemplify the invention is shown in FIGURES 7 and 8 as a laminated bar having a pair of elongated plate members 23 of generally identical outline with at least one curved end or nose portion 25. Situated between the pair of outer or face plate members 23 is an intermediate or spacer plate member 27 of lesser area which serves to space the outer members 23 from each other so as to provide a peripheral slot 27 which receives the teeth portions of the saw chain links for guiding the travel of a saw chain (not shown). United to portions of the edges of the outer plate members 23 are tip members 31 of a material having especially good wear resisting characteristics. In the disclosed embodiment, the curved edge of the nose or end portion 25 of each of the outer plate members 23 is tipped with wrought "Stellite."

The cutter bar 21 is produced, in accordance with the invention, by initially stamping the outer and intermediate plate members 23 and 27 from an alloy steel or other like material. As shown in FIGURES 5 and 7, the nose portion 25 of the outer plates has a lesser radius than the finished radius of the "Stellite" tipped plate. Subsequently, a tip of "Stellite" is applied to each of the outer plate members 23 around the reduced radius edge of the curved nose portion 25 where, during curvilinear movement of the saw chain, there is a greater tendency for wear than during movement of the saw chain along the relatively flat side edges of the cutter bar.

In the disclosed method, the "Stellite" tip members 31 are obtained by shearing an elongated strip 33 from a flat plate 34 of cast and rolled wrought "Stellite." As will become apparent, the shearing step, together with the subsequently occurring steps of the disclosed method, permit the manufacture of a cutter bar in which the grain structure of the outer edges of the tip members are essentially unchanged from its structure in the plate form, thereby retaining the advantages and mechanical properties resulting from the grain structure of the cast and rolled plate. In the shearing step, the edge strip 33 of the "Stellite" is heated by a flame distributor 36 or by a plurality of torches until a suitable control 38 actuates one or both of the blades or shear members 40 to separate the edge strip 33 from the remainder of the plate 34 in response to the attainment of a preselected temperature in the edge strip. Various controls can be used, as for instance, a color sensing control or a timer control. In the disclosed method, the shear blades 40 are operated when the temperature is about 1800° F., which temperature facilitates shearing, but does not cause material changes in the grain structure or physical properties of the cast and rolled "Stellite."

Prior to application of the tip member 31 to the nose portion of the outer plate member, the tip member is fabricated to conform generally to the contour of the edge of the nose portion 25. Formation of the tip members 31 from a straight form to a curved form is accomplished in a forming die, shown diagrammatically in FIGURE 4. The forming die 35 includes a male die member 37 having an edge surface 39 corresponding to the edge configuration of the nose portion 25 of the outer plate members 21, and a female die member 41 which receives the male die member 37, and in co-operation with the male die member, forms the strip 33 to the desired configuration.

As also shown in FIGURE 4, the forming die 35 is provided with guide means 43 for locating the strip 33 in relation to the female die member 41. Suitable electrical energy-supplying and connecting means 45 are also provided to facilitate electrical induction heating of the strip 33 prior to formation in the forming die. The temperature to which the strip 33 is heated should not be such to cause a material change in the grain structure or physical properties of the wear resisting material. In the disclosed embodiment, the forming die operates in response to a control which is actuated when the "Stellite" strip is heated to about 1800° F. This temperature does not cause material changes in the grain structure or resultant physical properties, but does sufficiently soften the material to facilitate bending. Of course, the temperature employed can be varied depending upon the particular wear resisting material being formed. If it is desired, one or both of the die members 37 and 41 can also be electrically or otherwise heated to facilitate formation of the strips 33 into the tip members 31.

After forming, the tip members 31 are applied to the bar flanges. If the bar is to be laminated, it is preferred to apply the tip members individually to the respective outer plate members 23. Prior to uniting of the tip members 31 to the nose portions of the plate members 23, each outer plate member is preferably preheated, preferably within a range of from about 400° F. and 600° F. In the disclosed embodiment, wherein a "Stellite" tip member 31 is applied to an alloy steel plate member 23, it is preferred to preheat the outer plate member to about 500° F. Preheating of the plate member facilitates fusion of the non-ferrous and ferrous material without raising the non-ferrous material to a temperature sufficiently high so that changes in grain structure or physical properties will occur, at least not along the outer edge surface of the non-ferrous material.

Peheating of the plate members 23 also serves to "over" expand the plate members 23 so that, upon cooling of the welded assembly of the plate member 23 and the tip 31, the tip will not crack, and excessive stress will not be induced, due to the uneven coefficients of expansion of the ferrous and non-ferrous materials.

After preheating of the plate member, the tip member 31 and the plate member 23 are placed in abutting relation to each other and clamped in a welding fixture 47. More specifically, as shown in FIGURE 6, the fixture 47 includes a bed 49 in the form of a plate having a shallow groove or recess 50 therein underlying the juncture of the tip member 31 with the plate member 23 to prevent welding of the resulting plate assembly to the bed. If desired, an insert of copper or other similar material could be used. The fixture 47 also includes a first clamp 51 which holds the plate member 23 on the bed 49 and a second clamp 53 engaging the outer, convex surface of the tip member 31 to retain the tip member in abutting engagement with the nose portion 25 of the plate member 23.

The tip member 31 is then arc welded by means of a pointed electrode 54 to the plate member 23 in an inert atmosphere or envelope, as indicated at 55. Particularly satisfactory results have been obtained when "Stellite" tips are welded to steel alloy plate members by using a 1% thoriated tungsten arc and an argon envelopment.

In order to prevent undesired change in the grain structure of the wear resistant tip member 31, and consequent loss in physical properties, the welding should progress at a linear rate which does not permit material change in the grain structure, at least along the convex surface of the tip member, but which does permit effective fusion of the wear resistant tip member 31 to the plate member 23. Welding of "Stellite" to an alloy steel plate member should progress at a rate of between about 16" per minute and about 20" per minute in order to prevent undesirable changes in the "Stellite" grain structure. Preferably, the welding should progress at a linear rate of about 18" per minute. In the disclosed method, the electrode 54 is propelled along the juncture of the tip member 31 and the plate member 23 by a chain operated device to insure constant traversal throughout the length of the juncture.

After welding of the wear resisting tip members 31 individually to the respective plate members 23 to form welded assemblies, the end parts 46 (one of which is shown in the dotted outline in FIGURE 5) of the tip members 31 are ground away to provide a smooth transition between the relatively flat or straight edge of the plate member 23 and the curved outer edge of the tip member 31.

Subsequently, a pair of the welded assemblies are riveted or cemented or brazed to an intermediate spacer member 27 to form the completed cutter bar 21. While various arrangements can be employed for fastening the plate members together, a brazing operation is preferred. It is carried on at a temperature which will also effect stress relief along the welded junction between the wear resistant tip members 31 and the outer plate members 23. In the case of a "Stellite" tipped cutter bar assembly, stress relief and brazing are simultaneously obtained by subjecting the assembly to a temperature of about 2050° F. for a period of approximately 90 minutes. The temperature employed and the time interval during which the cutter assembly is heated can be varied depending upon the wear resisting material involved, the brazing compound being used, and the temperature and time period during which the assembly is subject to heating.

As can be seen from an examination of FIGURES 1 and 2, wherein substantially the same thickness of "Stellite" has been applied to a plate member, the fusion produced by the disclosed method is far superior to the fusion produced by the before-mentioned prior method. As can be seen from FIGURE 1, when using the prior method a relatively thin zone 57 of fusion results between the wear resistant material 59 and the material 61 of the plate member, thereby producing a relatively weak joint. However, the disclosed method, as seen in FIGURE 2, results in a relatively thick zone or welded joint 63 in which the wear resisting material of the tip member 31 is fused with the material of the plate member 23, thereby providing a much superior weld. The welded joint is a mixture of the "Stellite" and steel and has a grain structure resembling that of the solidified "Stellite" which, as discussed with respect to the prior method, was deposited in molten form along the nose of the plate member. In addition, adjacent the joint is an area, indicated by the numeral 65, which is heat affected and can be described as having a grain structure resembling cast "Stellite" with large, more massive carbides than in the unaffected zone, which carbides tend to be dendritic. The disclosed invention permits the fabrication of a cutter bar having a "Stellite" tip wherein the physical properties of the major portion of the tip, and along the outer edge thereof, are essentially unchanged as compared to the physical properties of cast and rolled "Stellite." Also, since the tip is prefabricated and remains substantially distortion-free, the invention eliminates, except for grinding off of the end parts 46, most or all of the expensive and time consuming grinding heretofore required in order to obtain a smooth outer surface and a guide slot along the periphery of the cutter bar. The disclosed cutter bar construction is also free of internal stresses normally found in the prior construction referred to above.

What is claimed is:

1. A method of fabricating a saw chain bar including a main portion of ferrous material and a surface portion of wear-resistant, non-ferrous metallic alloy material, said method comprising the steps of fabricating a bar element of ferrous material with an arcuate margin, heating a wear-resistant, solidified, non-ferrous metallic alloy material without substantially affecting the grain structure of the non-ferrous material, bending the heated, non-ferrous material, into an arcuate strip to fit the arcuate margin of the bar element, and fusing the arcuate strip to the arcuate margin of the bar element.

2. A method of fabricating a saw chain bar including a main portion of ferrous material and a surface portion of wear-resistant, non-ferrous metallic alloy material, said method comprising the steps of fabricating a bar element of ferrous material with an arcuate margin, heating a wear-resistant, non-ferrous metallic alloy material by electrical induction without substantially affecting the grain structure of the non-ferrous material, bending the heated non-ferrous material, into an arcuate strip to fit the arcuate margin of the bar element, and fusing the arcuate strip to the arcuate margin of the bar element.

3. A method of fabricating a saw chain bar including a main portion of ferrous material and a surface portion of hard, non-ferrous metallic alloy material, said method comprising the steps of fabricating a bar element of ferrous material with an arcuate margin, heating a non-ferrous solidified metallic alloy material without substantially affecting the grain structure of the non-ferrous material, bending the heated non-ferrous material, into an arcuate strip to fit the arcuate margin of the bar element, heating the bar element, and fusing the arcuate strip to the arcuate margin of the bar element immediately after said heating of the bar element to permit fusing of the ferrous material and the non-ferrous material without substantially affecting the grain structure of the non-ferrous material along the outer edge surface of the resulting assembly of the bar element and arcuate strip.

4. A method of making a cutter bar having a pair of opposed side faces and an edge portion of non-ferrous, wear-resistant, metallic alloy material, which edge portion has therein a peripheral slot disposed intermediate said opposing side faces, said method comprising the steps of fabricating a pair of generally similar plate members of ferrous material, heating a pair of strips of non-ferrous, solidified metallic alloy material by electrical induction without substantially changing the grain structure of the non-ferrous material, bending the heated strips of non-ferrous material into a pair of elongated members having one edge with a configuration corresponding to a curved edge segment of the plate members, placing said non-ferrous members with said one edges in abutting engagement with said curved edge segments of said plate members, fusing said non-ferrous members to said plate members to form a pair of assemblies while enveloping the materials being fused in an inert atmosphere, and subsequently joining said fused assemblies in spaced apart relation so as to provide a slot between said non-ferrous members.

5. A method of fabricating a chain saw bar including a main portion of ferrous material and a surface portion of wear-resistant, non-ferrous metallic alloy material, said method comprising the steps of fabricating a bar element of ferrous material with an arcuate margin, casting and rolling a non-ferrous metallic alloy material into a plate, heating an edge strip of the plate to a preselected temperature without changing the grain structure thereof, shearing the edge strip from the plate while the plate is heated, reheating the edge strip to a predetermined temperature without changing the grain structure thereof, bending the edge strip while reheating the strip to the curve of the arcuate margin of the bar element and fusing the arcuate strip to the arcuate margin of the bar element.

References Cited by the Examiner

UNITED STATES PATENTS

| 1,025,735 | 5/1912 | Bosredon | 29—497 X |
|---|---|---|---|
| 2,297,878 | 10/1942 | Denneen et al. | 148—127 |
| 2,633,633 | 4/1953 | Bogart et al. | 148—127 X |
| 2,707,627 | 3/1955 | Driehaus | 29—482 X |
| 2,716,690 | 8/1955 | Lund | 29—488 X |
| 2,728,566 | 12/1955 | Barnett | 143—32 X |
| 2,838,833 | 6/1958 | Richardson | 29—463 |
| 2,897,856 | 8/1959 | Carlton | 143—32 |
| 2,948,309 | 8/1960 | Hoff et al. | 143—32 |
| 2,962,812 | 12/1960 | Gommel | 29—463 |
| 3,046,649 | 6/1962 | Brennan | 29—498 X |
| 3,119,418 | 1/1964 | Rayniak | 76—112 X |

DONALD R. SCHRAN, *Primary Examiner.*